Oct. 20, 1953    J. C. HEINTZ, JR    2,655,974
BRAKE SHOE BONDER
Filed Nov. 23, 1949    3 Sheets-Sheet 1

Inventor
JAMES C. HEINTZ JR.

Gordon C. Mack
ATTORNEY

Oct. 20, 1953  J. C. HEINTZ, JR  2,655,974
BRAKE SHOE BONDER

Filed Nov. 23, 1949  3 Sheets-Sheet 2

Inventor
JAMES C. HEINTZ JR.

By Gordon C. Mack
ATTORNEY

Oct. 20, 1953  J. C. HEINTZ, JR  2,655,974
BRAKE SHOE BONDER
Filed Nov. 23, 1949  3 Sheets-Sheet 3
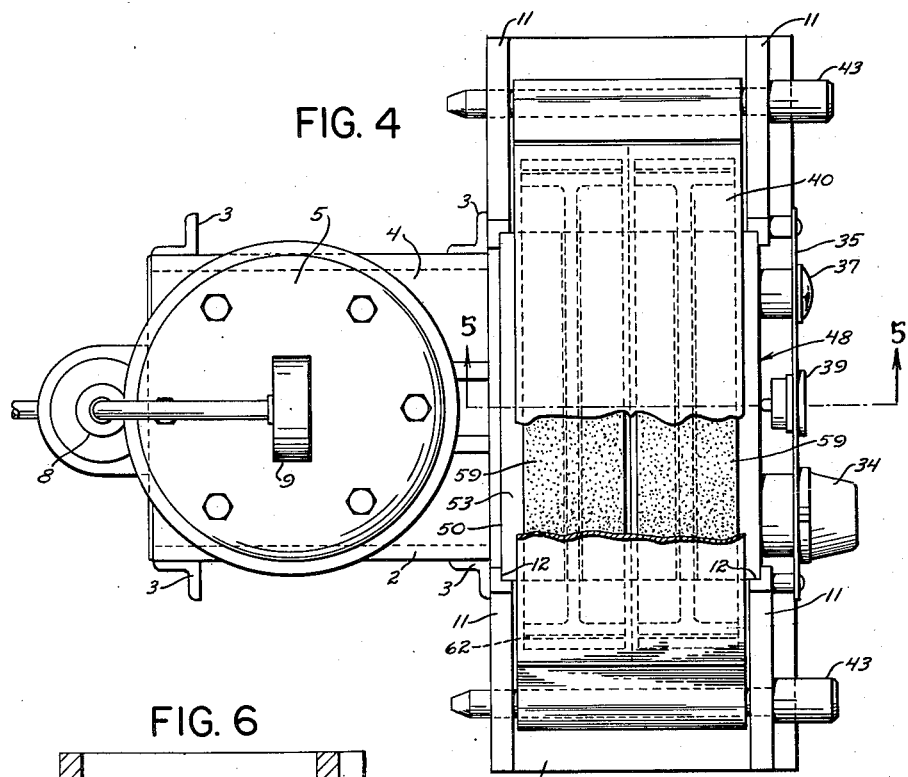
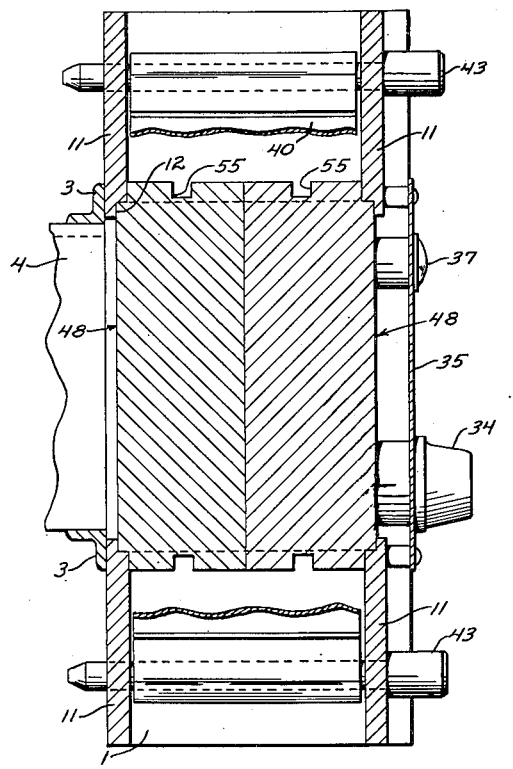
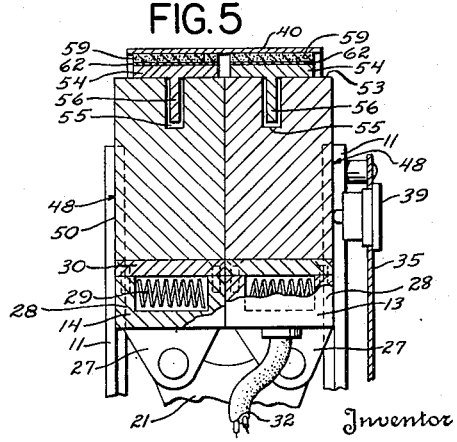
INVENTOR
JAMES C. HEINTZ JR.
ATTORNEY Patented Oct. 20, 1953

2,655,974

UNITED STATES PATENT OFFICE 2,655,974

BRAKE SHOE BONDER

James C. Heintz, Jr., Lakewood, Ohio

Application November 23, 1949, Serial No. 129,118

15 Claims. (Cl. 154—1)

This invention relates to brake shoe bonders for bonding friction-lining material to a brake shoe. More particularly, it relates to equipment for applying uniform and constant pressure between a plurality of linings and their respective shoes, throughout the bonding operation.

The practice of applying a brake lining to a brake shoe by riveting the lining thereto has now been largely superseded by the recently developed method of adhesively bonding the lining material to the brake shoe. In this method the friction-lining material is positioned on the curved operating surface of a heated brake shoe with a layer of thermosetting adhesive interposed between them. The adhesive is usually applied in the form of a tape about $\frac{1}{16}$ inch thick. Heat sets the adhesive compound (by polymerization or otherwise). When heat is applied, the adhesive tends to liquefy before setting, and some is absorbed by the lining material and some may ooze out of the lamination. In any event, the thickness of the adhesive-bearing tape is reduced.

In the bonder of this invention the pressure which forms the bond between the lining and the shoe is exerted by a fluid-pressure cylinder and it remains constant even though, during the bonding process, the thickness of the layer of adhesive is reduced. The preferred bonder accommodates a plurality of shoes and applies uniform and constant pressure between each of the shoes and its respective lining, through the bonding process. The pressure member which contacts the linings is preferably flexible, and the pressure is applied by fixing the two ends of this member and moving into it the assemblies of the respective brake shoes and linings. The brake shoes are supported on one or more mandrels, and heat for setting the adhesive is supplied to the mandrels during the pressing operation. As it is customary to line brake shoes in pairs, each device is advantageously designed to line two brake shoes simultaneously.

A preferred bonder is constructed of a frame which forms a vertical guideway. Heaters located in the guideway are adapted to be moved up and down therein. The pressure cylinder, preferably operated pneumatically, is located on the frame adjacent to the guideway. The piston of the cylinder is connected to the heaters through a first-class lever or other suitable means, and preferably also through pressure-equalizing means so that equal pressure is applied to each heater even though one may move more than the other in forming the bonds between the respective shoes and linings. The brake shoes are held in mandrels. Mandrels of different sizes are provided to hold brake shoes of different sizes. The mandrels are removably positioned on the respective heaters and are heated by them, and move up and down in the guideway with them.

The flexible pressure member is advantageously a steel strap provided with a loop at each end, with each end removably fastenable at different locations to permit the same strap to be used with mandrels and brake shoes of different radii.

The invention will be further described with reference to the drawings, in which is illustrated a preferred form of the invention.

Fig. 4 is a top view of the bonder, with a portion of the pressure strap broken away;

Fig. 5 is a sectional view through the mandrels, etc., taken on the line 5—5 of Fig. 4;

Fig. 6 is a sectional view through the bonder on the line 6—6 of Fig. 1;

Figure 1:
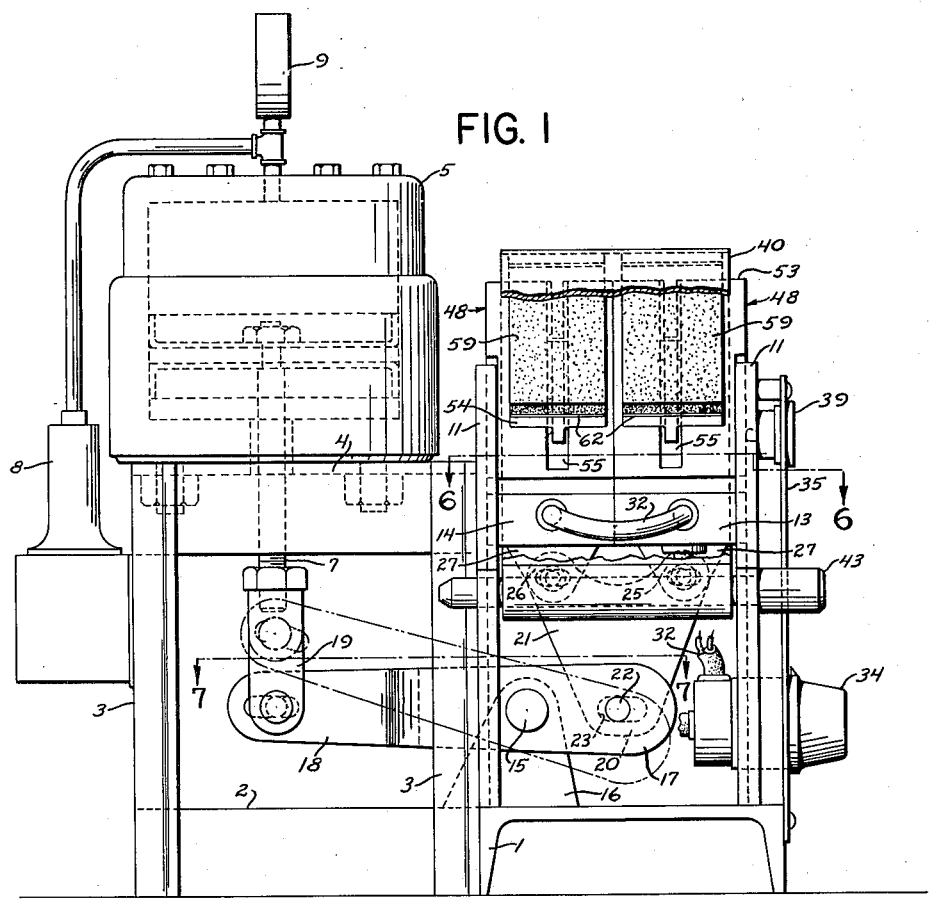
Fig. 1 is a side elevation of the bonder with the flexible pressure strap partially broken away to show the brake shoes and linings underneath it.
Figure 7:
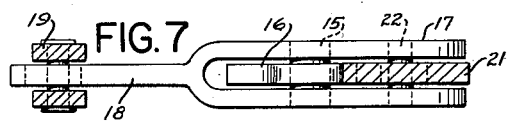
Fig. 7 is a top view of the lever linkage taken on the line 7—7 of Fig. 1.

The base of the brake shoe bonder consists of two inverted channel sections 1 and 2 which are welded together to form a T. At the corners of the channel 2, which is the stem of the T, there are upstanding angle iron supports 3, which support the corners of a plate 4. A pneumatic cylinder 5 is bolted to the top of plate 4 and is positioned with its piston rod 7 (Fig. 1) projecting downwardly through an opening in the plate. Air may be admitted to and exhausted from the cylinder through suitable valve connections and the piping 8. An air pressure gauge 9 is provided. A cylinder actuated by water, oil, or any other fluid, under pressure, may be used instead of the preferred pneumatic cylinder 5.

Figure 2:
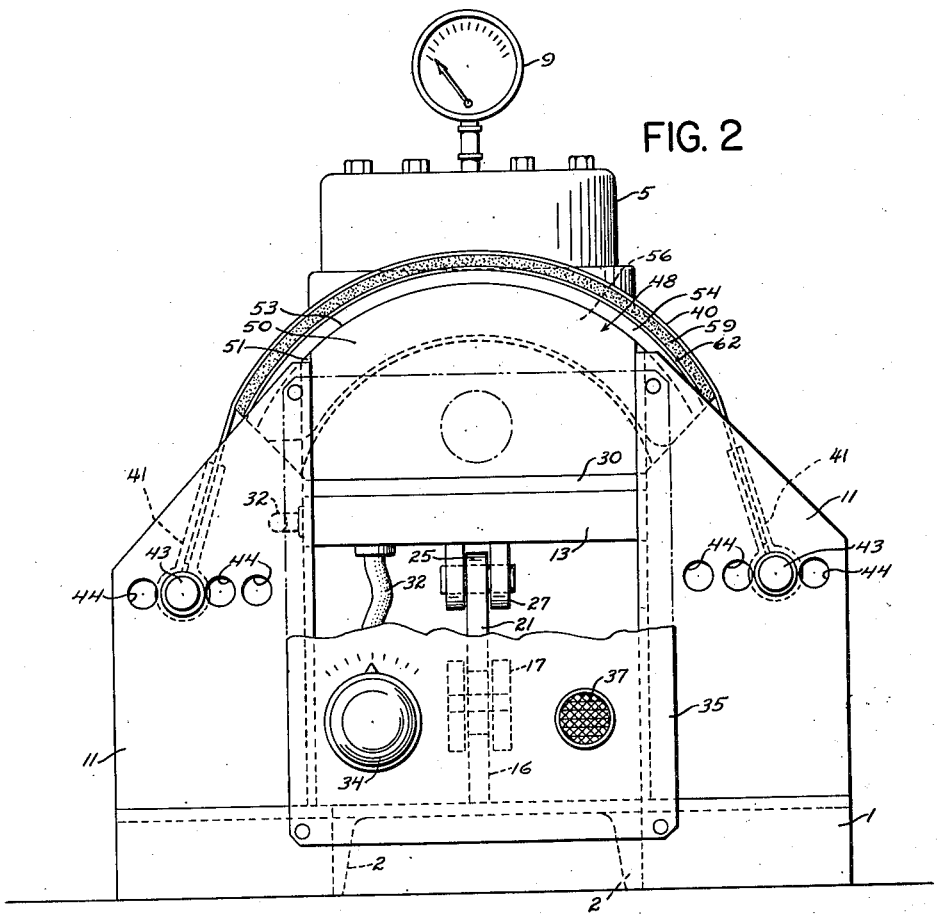
Fig. 2 is a front elevation of the bonder with the brake shoes and linings positioned on a mandrel in pressure contact with the flexible strap.

A side plate 11 is welded upright on each corner of the channel 1. These plates are parallel with the sides of the channel 1 and extend in from the ends of the channel 1 only a relatively short distance (Fig. 2). Along the innermost corner of each of these plates a right angle section is cut away so that the four plates 11 cooperate to form a vertical guideway 12 (Figs. 4 and 6). The heaters 13 and 14 are mounted for vertical movement in this guideway.

The pivot 15 supported in lug 16 fastened to the base of the frame below the heaters supports the tines 17 of a fork which form the shorter end of a lever arm. The longer portion 18 of this lever arm is pivotally fastened in the clevis 19 on the bottom of piston 7. The tines 17 of the fork lie on opposite sides of the lower corner 20 of the generally triangular or three-cornered plate 21 and are pivotally connected to this corner of the plate by the pin 22. The pin 22 fits loosely through a horizontal slot 23 in corner 20, and the ends of the pin are rigidly fastened to the tines 17 of the fork. The two upper corners 25 and 26 of plate 21 are pivotally fastened to lugs 27 which extend downwardly from the heaters 13 and 14. These connections permit a slight relative vertical movement between the two heaters which is advantageous when the lamination to be cured on one brake shoe is slightly thinner (or during cure becomes slightly thinner) than the lamination on the other brake shoe. (See Fig. 9.) Ordinarily the heaters will be moved up and down in the guideway 12, side-by-side. The lever arm converts the downward force exerted by piston 7 into an upward force which lifts the heaters 13 and 14 in the guideway. The pivot 15 may be located at any desired position intermediate the ends of the lever arm to compound the force of the cylinder any desirable amount.

The heaters 13 and 14 are best illustrated in the sectional view shown in Fig. 5. Each includes a box 28 in which is a resistance heating coil 29, and a cover 30 bolted to the box. Electrical cable 32 supplies power to each of the coils 29 and is connected with a suitable timing switch 34 which is mounted on plate 35 at the front of the apparatus. Warning light 37 is connected in the timing circuit to indicate when the bonding process is completed. A temperature gauge 39 is also provided on plate 35.

The pressure member 40 is a flexible non-elastic steel strap. A loop 41 is fastened to each end of the strap and these ends are held between the upright plates 11 by pins 43 which extend through the loops and also through any set of the holes 44 in the plates 11. A number of holes 44 are provided in each plate, so that the ends of the strap may be fastened at different positions and the same strap can be used with different sized brake shoes.

Figure 8:
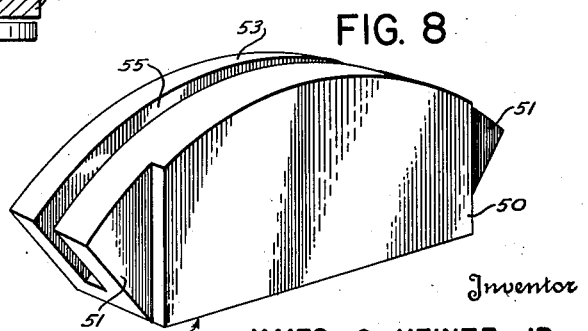
Fig. 8 is a perspective view of a mandrel.

Each of the mandrels 48 rests on the top of one of the heaters 13 and 14. The mandrels are made of a heat conducting material so that they efficiently transfer heat from the heaters to the brake shoes. One of the mandrels is illustrated in Fig. 8. One side of each mandrel (the back side in Fig. 8) is flat and when a pair of the mandrels is in the guideway these sides are in contact with one another. The side 50 is provided with stepped portions 51 at each end which fit inside the plates 11. The upper surface 53 of the mandrel is convex to conform to the concave curvature of the flange 54 of the brake shoe and this upper surface is grooved at 55 to receive the web 56 of the brake shoe. A number of pairs of mandrels may be provided for each bonder to handle brake shoes of different sizes. The different mandrels will each be provided with identical stepped portions 51 so that they will each fit the guideway 12.

Mandrels of other design may be used so long as they may be fitted into the guideway of the device. It will be particularly advantageous to use the improved mandrel described and illustrated in my co-pending application Serial Number 129,119, filed November 23, 1949. This mandrel is formed in two sections between which the web of the brake shoe is held. The sections are both heated and each is pressed tightly against the web by spring means, so that the flange of the brake shoe is heated uniformly.

To bond lining 59 to a brake shoe, the convex outer surface of the flange 54 is thoroughly cleaned from rust and whatever residue there may be from the old lining. A thermosetting adhesive 62, preferably in the form of a tape, is then applied to the cleaned surface. Any adhesive may be used which on heating is capable of uniting the lining 59 to the flange 54. The lining 59 is placed over the adhesive and then the brake shoe is positioned on the proper sized mandrel. The mandrels need not be removed from the device after a cure is made so that usually the mandrels will be already in the guideway and the shoes together with the laminations will be simply slipped on to the mandrels.

Figure 3:
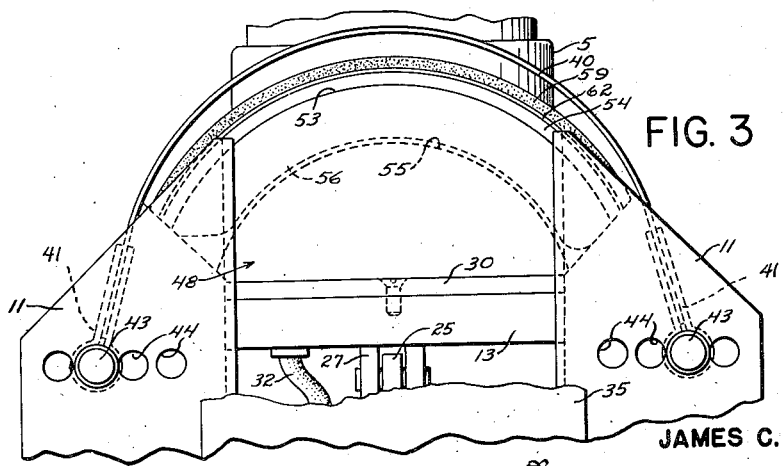
Fig. 3 is a view similar to Fig. 2, but showing the mandrels carrying the brake shoes and lining material out of contact with the flexible pressure member.

The ends of the strap 40 are held by the pins 43 in those holes 44 which will best accommodate the particular mandrels employed. The position of the apparatus after it has been assembled and before pressure is applied is shown in Fig. 3. Air under pressure is introduced into the pneumatic cylinder 5 and the timing switch 34 is started. This forces piston 7 downward thereby raising the heaters 13 and 14 carrying the mandrels and the brake shoes, and presses the lamination tightly against the strap 40. As the heat softens the adhesive it impregnates the lining and, although this will reduce the thickness of the lamination, the pressure remains constant. When the adhesive has been set the air pressure is turned off manually or automatically, and the weight of the heater and mandrel cause the short end of the lever arm to resume the position shown in Fig. 1.

The lining 59 is a tough, pressed fiber composition formed in strips which are usually from about ⅛ to ₁⁵⁄₁₆ inch thick. One of the lining strips may be slightly thicker than another, and there may be a similar variation in the relative thicknesses of the adhesive strips. Also the flanges of the brake shoes may be of different thickness. Therefore the total thickness of the flange and the lamination of one of the brake shoes may differ from that of the other shoe— for example, as much as ₁⁄₁₆ inch. The pressure of the two shoes and laminations against the strap 40 is equalized by the three-cornered plate 21 which permits relative vertical movement between the two heaters.

Figure 9:
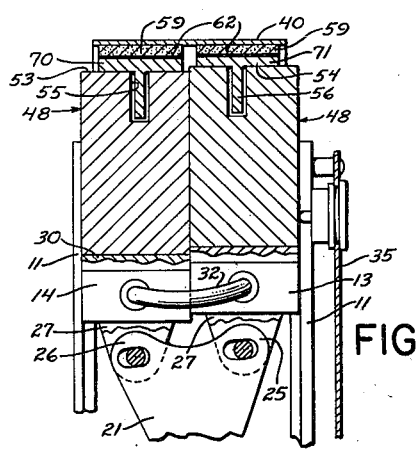
Fig. 9 is a cross sectional view through the mandrels, etc. quite similar to Fig. 5 with one of the mandrels raised slightly higher than the other.

Fig. 9 shows two brake shoes 70 and 71 positioned on mandrels 48 in the bonder with the lamination of each shoe in pressure contact with strap 40. The flange and lamination of brake shoe 70 are shown thicker than the flange and lamination of shoe 71. When pressure is applied with these brake shoes positioned on the mandrels, the lever arm lifts the heaters and mandrels side-by-side until the lining of brake shoe 70 is in pressure contact with the strap. The upward movement of this brake shoe will then stop. The continued upward force exerted by the lever arm then rotates the three-cornered plate 21 slightly about the pivotal connection at corner 26 causing the mandrel carrying shoe 71 to move upward relatively to the other mandrel until both brake shoes are in pressure contact with the strap and the linings and adhesives are under equal pressure. The slotted connection of lower corner 20 and the clearances at the other pivotal connections will permit this slight rotation of the plate 21 about either of its corners 25 or 26.

Adhesives which set by polymerizing and adhesives which set by other chemical interaction (e. g., adhesives of the phenol-aldehyde type, etc.) may be used. The temperatures and times of heating required for the different adhesives are known in the art.

The mandrel, and even the brake shoes, may be preheated to speed the operation of the bonder.

The invention is described herein with reference to an internal expanding type brake shoe having an arcuately curved, flat flange with an arcuate thin web projecting from the concave side of the flange. This type shoe is T-shaped in transverse cross section and is commonly used in brakes for motor vehicles. It is recognized that this brake shoe bonder may be adapted for other types of brake shoes or members carrying such a friction lining facing. For example, mandrels may be provided to accommodate shoes having two projecting webs, and other mandrels may be provided together with suitable pressure members to accommodate brake shoes of different curvatures. If desired the device may be easily designed with only one heater adapted to carry one or more mandrels. It is recognized that the heating unit may be slightly convex and the under-surface of the mandrels correspondingly concave to make more uniform the depth of the mandrel through which the heat must be transferred from the heater. Other modifications may be made in the equipment and process without departing from the invention which is defined in the appended claims.

What I claim is:

1. A brake-shoe bonder for bonding friction lining material to a brake shoe which comprises a pressure member adapted to fit against the lining, a heat-conductive outwardly curved, elongated mandrel with a longitudinal groove therein for supporting the brake shoe and a guideway therefor, a pressure cylinder equipped with a piston, means to transmit force exerted by the piston to the mandrel and means for heating the mandrel.

2. A brake-shoe bonder for bonding friction lining material to a brake shoe which includes a guideway, a heater slidably mounted in the guideway, adjacent the heater a removable mandrel with a curved slit surface to hold at least one brake shoe, a pressure member, and yieldable means for exerting pressure against the heater to press the mandrel and brake shoe toward the pressure member.

3. A brake-shoe bonder for bonding friction lining material to a brake shoe which includes a vertical guideway, a heater adapted to slide up and down in the guideway, removably mounted on the heater a heat-conducting mandrel adapted to hold a curved brake shoe having fresh lining material thereon, a pressure member over the lining material, and yieldable means for exerting upward pressure on the heater to press the lining material against the pressure member.

4. A brake-shoe bonder for bonding friction lining material to a brake shoe which includes a vertical guideway, a heater adapted to slide up and down in the guideway, removably mounted on the heater a heat-conducting mandrel adapted to hold a curved brake shoe having fresh lining material thereon, a flexible steel strap removably located over the lining material, and means for exerting upward pressure on the heater to press the lining material against the strap.

5. A brake-shoe bonder for bonding friction lining material to a brake shoe which includes a vertical guideway, a heater adapted to slide up and down in the guideway, removably mounted on the heater a heat-conducting mandrel adapted to hold a curved brake shoe having fresh lining material thereon, a pressure member over the lining material which conforms to the curvature of the brake shoe, a pressure cylinder equipped with a piston, and means connecting the piston and heater to move the heater upward to press the lining material against the pressure member.

6. A brake-shoe bonder for bonding lining material to a brake shoe which comprises a guideway, across the guideway a flexible pressure member at least one end of which is removably fastened to the bonder, movably positioned in the guideway, a support adapted to hold a brake shoe with lining material thereon, and yieldable means for moving the support in the guideway toward the flexible member.

7. A brake-shoe bonder for bonding lining material to a brake shoe, which comprises a flexible pressure member the ends of which are fastened by removable means adapted to be located at different positions in the bonder to give a desired curvature to the pressure member, an outwardly curved, elongated mandrel with a longitudinal groove therein adapted to hold a brake shoe with lining material thereon, means for heating the mandrel, a guideway therefor and yieldable means for pressing the mandrel toward the flexible member.

8. A brake-shoe bonder for bonding friction lining material to a brake shoe which includes a flexible pressure member, a plurality of means positioned side-by-side, each for supporting a brake shoe having adhesive and lining material thereon, means for exerting pressure on the plurality of supporting means to press them toward the flexible member, and pressure-equalizing means between the pressure-exerting means and the several supporting means whereby the pressure is distributed uniformly so that each supporting means exerts the same pressure toward the flexible member regardless of the distances the respective supporting means are moved toward the flexible member.

9. A brake-shoe bonder for bonding friction lining material to a brake shoe which comprises grooved, outwardly curved, elongated mandrels for supporting a plurality of brake shoes with adhesive and lining on each, a pressure member, means for pressing said mandrels toward the pressure member so as to thereby press the linings and shoes toward one another and pressure-equalizing means for applying the same pressure to each of the shoes and its respective lining.

10. A brake-shoe bonder for bonding friction lining material to a brake shoe which comprises grooved, outwardly curved, elongated mandrels for supporting a plurality of brake shoes with adhesive and lining on each, a pressure member, means for pressing said mandrels toward the pressure member so as to thereby press the linings and shoes toward one another, and pressure-equalizing means between the pressing means and the pressure member for applying the same pressure to each of the shoes and its respective lining.

11. A brake-shoe bonder for bonding friction lining material to a brake shoe which includes a guideway, two heaters movably positioned side-by-side in the guideway, each heater being adapted to supply heat to a brake-shoe support during the application of a lining thereto, means for exerting pressure against the heaters to move them in the guideway, and pressure-equalizing means connecting the respective heaters with the pressure-exerting means whereby the heaters are movable relatively to one another.

12. A brake-shoe bonder for bonding friction lining material to a brake shoe which includes a vertical guideway, two heaters positioned side-by-side in the guideway and movable vertically therein, lining-contacting means across the guideway, pressure-exerting means adapted to move the heaters toward the lining-contacting means, and means connecting the respective heaters with the pressure-exerting means whereby the heaters are movable relatively to one another.

13. A brake-shoe bonder for bonding friction lining material to a brake shoe which includes a vertical guideway, two heaters positioned side-by-side in the guideway and movable vertically therein, lining-contacting means across the guideway, pressure-exerting means adapted to move the heaters toward the lining-contacting means, and a three-cornered plate two corners of which are pivotally fastened to the respective heaters and the third corner of which is pivotally fastened to the pressure-exerting means.

14. A brake-shoe bonder for bonding lining material to a brake shoe, a vertical guideway, a heater slidably mounted in the guideway, adjacent the heater a mandrel with a curved slit surface to hold at least one brake shoe, a flexible pressure member, and yieldable means for exerting constant pressure against the heater to press the mandrel and brake shoe toward the pressure member.

15. A brake-shoe bonder for bonding friction lining material to a plurality of brake shoes which includes a pressure member adapted to apply pressure to lining materials conformed to the shape of the brake shoes, a plurality of grooved, outwardly curved, elongated mandrels positioned side-by-side, each for supporting a brake shoe having adhesive and lining material thereon, a support for each mandrel, pressure-equalizing means attached to the several supports whereby pressure applied thereto is distributed uniformly so that the same pressure is supplied to each support regardless of the distance each support moves when pressure is applied, and means for pressing said pressure member and the pressure-equalizing means against brake shoes supported by said mandrels.

JAMES C. HEINTZ, Jr.

References Cited in the file of this patent
UNITED STATES PATENTS

| Number | Name | Date |
| --- | --- | --- |
| 1,807,443 | Senn | May 26, 1931 |
| 1,849,991 | Pioch | Mar. 15, 1932 |
| 2,139,876 | Bullington | Dec. 13, 1938 |
| 2,269,758 | Noronha | Jan. 13, 1942 |
| 2,416,427 | Bonawit | Feb. 25, 1947 |
| 2,434,379 | Wiesner et al. | Jan. 13, 1948 |
| 2,494,281 | Batchelor | Jan. 10, 1950 |
| 2,520,978 | Super | Sept. 5, 1950 |
| 2,559,748 | Batchelor et al. | July 10, 1951 |
| 2,569,737 | Spanich | Oct. 2, 1951 |

OTHER REFERENCES

Grizzley: "Saftibond" Brake Lining-Bonding Equipment, Grizzley Manufacturing Co., Paulding, Ohio, Printed July 1949.